Patented Mar. 14, 1950

2,500,229

UNITED STATES PATENT OFFICE 2,500,229

POLYMERIC 2,2,4 - TRIMETHYL-TETRA-HYDRO-QUINOLINE AS STABILIZER FOR DIENE POLYMERS

James B. Arnold and Lester J. Dankert, Midland, Mich., assignors to The Dow Chemical Company, Midland, Mich., a corporation of Delaware No Drawing. Application September 28, 1946, Serial No. 700,165

8 Claims. (Cl. 260—45.8)

This invention concerns a new agent for the stabilization of organic thermoplastic materials, especially solid polymers of unsaturated organic compounds, against deterioration under the action of heat, light, or air. It also pertains to resinous and rubber-like thermoplastic organic materials comprising the stabilizing agent. The invention pertains particularly to the stabilization of mixed polymers of vinyl aromatic compounds and aliphatic conjugated diolefines such as are disclosed in U. S. Patent 2,388,685. These mixed polymers are more intimately associated than when merely mechanically admixed and, for convenience, are hereinafter termed "composite polymers."

It is known that most thermoplastic organic materials, especially those obtained by the polymerization of unsaturated organic compounds, and more particularly the above-mentioned composite polymers, undergo discoloration or deterioration when heated or permitted to stand under exposure to light and air unless stabilized by incorporation of a stabilizing agent therewith. The deterioration, usually known as "aging," results in discoloration of transparent colorless resins, such as polystyrene or methyl methylacrylate, etc., and in hardening, embrittlement of, or development of cracks in, rubberlike materials such as natural rubber, Buna-S, etc. In some instances, aging results in impairment of other mechanical properties such as tensile strength or elasticity, etc.

Although a variety of antioxidants and other stabilizing agents are known which, when incorporated in a resinous or rubber-like organic materials, serve to retard or prevent aging, the agents which are effective in stabilizing one such organic material, often are uneffectual in stabilizing other resinous or rubber-like products. Also, the agents which are satisfactory in preventing aging of a particular product often modify one or more properties of the latter, e. g. the color, tensile strength, dielectric properties, or ability of the product to be extruded or molded into accurately dimensioned smooth-surfaced articles, and thereby limit the fields of utility of a product treated therewith.

The problem of finding a satisfactory stabilizing agent for the above-mentioned composite polymers of vinyl aromatic compounds and diolefines has been particularly difficult. Such composite polymers, as shown in U. S. Patent 2,388,685 are prepared by polymerizing in aqueous emulsion a monovinyl aromatic compound such as styrene, ortho-methyl-styrene, para-methylstyrene, or para-chlorostyrene, etc., thereafter adding to the same aqueous emulsion an aliphatic conjugated diolefine such as butadiene-1.3, isoprene, 2.3-dimethyl-butadiene-1.3, or 2-ethyl-butadiene-1.3, etc., and polymerizing the diolefine while present in the emulsion of the polymerized vinyl aromatic compound. A stabilizing agent is preferably added to the resultant polymer emulsion prior to coagulating the product. The stabilized product, after being separated from the emulsion, extrudes readily to produce uniformly-dimensioned, smooth-surfaced rods, and it may readily be molded into articles of desired sizes and shapes. The product is quite flexible when in the form of a rod of 0.25 inch diameter or less and has an unusual property of being nearly as flexible at temperatures below —50° C. as at room temperature. However, unless treated to incorporate a stabilizing agent therewith, the composite polymers undergo discoloration, embrittlement, and in some instances combustion, when heated or permitted to stand under exposure to light and air.

Although agents capable of stabilizing the composite polymers against one or more of the detrimental actions of heat, light, and air, have previously been known, the agents known for this purpose have either failed satisfactorily to stabilize the material against all of the detrimental actions commonly associated with aging, or have modified one or more properties of the composite polymer so as to limit its fields of utility. For instance, the agent heretofore considered most satisafctory, and employed commercially, for the stabilization of the aforementioned composite polymers is difficult to incorporate uniformly with the emulsified product, but is best incorporated with the emulsion under acidic conditions prior to or during coagulation of the product. After coagulation, it is difficult to free the product entirely of the acid. As a result, corrosion of metal molds or dyes employed in shaping the product has, in some instances, occurred and the dielectric properties have sometimes been impaired. Also, the stabilizing agent imparted to the product a blue color which changed to black on standing and which, because of occasional non-uniform incorporation in the product, sometimes gave the latter an unpleasing mottled appearance. Because of the color imparted by the stabilizing agent itself, it has been difficult to incorporate other coloring agents, e. g. dyes or pigments, in the product to obtain desired colors of good uniformity and good stability against change in shade or color under exposure to light.

It is an object of this invention to provide a new agent which, when incorporated in thermoplastic organic materials, especially resinous or rubber-like polymers and copolymers of aliphatic conjugated diolefines, is effective in inhibiting the deleterious effects of aging without itself causing appreciable discoloration of the thermoplastic material treated therewith. A further object is to provide thermoplastic resinous and rubber-like materials, particularly the aforementioned composite polymers of vinyl aromatic compounds and aliphatic conjugated diolefines, in a form stabilized against the effects of aging by having said stabilizing agent incorporated therewith. Other objects will be apparent from the following description of the invention.

The stabilizing agent provided by the invention is a hydrogenation product of a polymer of 2,2,4-trimethyl-dihydroquinoline. The hydrogenated product consists principally, if not entirely, or polymerized 2,2,4-trimethyl-tetrahydroquinoline.

The polymerized 2,2,4-trimethyl-dihydroquinoline employed in preparing the new stabilizing agent may be obtained by treating the condensation product of acetone and aniline, which condensation product comprises 2,2,4-trimethyl-dihydroquinoline, with concentrated hydrochloric acid, and heating the acidified material, e. g. at temperatures of from 85° to 90° C. for about 20 hours. A more detailed description of the preparation of the polymerized 2,2,4-trimethyl-dihydroquinoline is given in the Ingram U. S. Patent 2,064,752.

The polymerized 2,2,4-trimethyl-dihydroquinoline is, itself, effective as an anti-aging agent for the aforementioned composite polymers of vinyl aromatic compounds and aliphatic conjugated diolefines and also for other resinous or rubber-like organic materials. However, when incorporated with such composite polymer, it discolors the latter appreciably and, in most instances, reduces somewhat the percent elongation value of the treated polymer. It also renders more difficult the operation of extruding the treated material to produce uniformly-dimensioned articles having smooth surfaces. We have found that, by hydrogenating the polymerized trimethyl-dihydroquinoline, a colorless to light-tan colored resinous material is produced which may readily be incorporated with a composite polymer, e. g. of styrene and butadiene, and which is substantially free of such objectionable characteristics when incorporated in such composite polymer. The hydrogenated product is rich in polymeric 2,2,4-trimethyl-tetrahydroquinoline.

The hydrogenation of polymeric 2,2,4-trimethyl-dihydroquinoline to form polymeric 2,2,4-trimethyl-tetrahydroquinoline is accomplished by heating the molten material, or a solution thereof, together with a minor amount of an effective hydrogenation catalyst, e. g. from 0.1 to 1 per cent by weight of finely divided palladium, under pressure in contact with hydrogen. The reaction is usually carried out at temperatures between 100° and 200° C. and hydrogen pressures of from 300 to 500 pounds per square inch, gauge, but it may be accomplished at lower or higher temperatures or pressures. The mixture is preferably agitated during the reaction. When the reaction is carried out in the absence of a solvent, or in the presence of a saturated solvent, e. g. cyclohexane, incapable of being hydrogenated, the extent of the reaction may be followed by observing the decrease in pressure as hydrogen is consumed. The reaction is preferably continued until hydrogen has been consumed in amount corresponding approximately to that theoretically required for conversion of the polymeric trimethyl-dihydroquinoline to polymeric trimethyl-tetrahydroquinoline. The reaction is usually complete in less than 40 hours, but longer times of reaction are sometimes required.

After completing the reaction, the pressure is released, the reaction vessel opened, and the catalyst is separated, e. g. by filtration, from the reaction mixture. In instances in which the hydrogenation is carried out in the absence of a solvent, the product is first dissolved or diluted with a solvent so as to permit ready filtration to remove the catalyst. Any of a wide variety of solvents such as benzene, toluene, xylene, ethylbenzene, chlorobenzene, methyl alcohol, ethyl alcohol, acetone, liquid petroleum fractions, or cyclohexane, etc., may be employed for the purpose. Dilution of the reaction product with an equal weight or more of benzene, cyclohexane, or ethylbenzene, is usually sufficient to permit filtration.

After removal of the catalyst, the solvent may, if desired, be distilled to obtain the polymeric 2,2,4-trimethyl-tetrahydroquinoline as a residue. The product is a resinous material, usually of light-tan color, and probably is colorless when entirely pure. In most instances, the color of the product is less intense than that of the polymeric 2,2,4-trimethyl-dihydroquinoline starting material and is not sufficient to impart appreciable discoloration to resinous or rubber-like materials subsequently stabilized therewith.

The polymeric trimethyl-tetrahydroquinoline may be incorporated together with a resinous or rubber-like material in any of several ways, e. g., by hot milling of the trimethyl-tetrahydroquinoline together with the material to be stabilized therewith, or by addition to a solution or aqueous emulsion of the material to be stabilized, etc. The addition may be accomplished under neutral, acidic, or moderately basic conditions, as desired. In instances in which the resinous or rubber-like material which is to be stabilized is prepared, e. g. by polymerization, in aqueous emulsion, the polymeric trimethyl-tetrahydroquinoline is usually added in emulsified form to the emulsion of material to be stabilized prior to coagulating said material. The coagulated product comprises most, if not all, of the polymeric trimethyl-tetrahydroquinoline uniformly admixed therewith. In most instances, incorporation of from 0.5 to 3 per cent by weight of the polymeric trimethyl-tetrahydroquinoline in a resinous or rubber-like material is sufficient to stabilize the material satisfactorily against the action of heat, light, or air under the conditions usually encountered during drying, fabrication or use of the material. The polymeric trimethyl-tetrahydroquinoline may be used in proportions smaller or considerably larger than those just recommended.

Other addition agents such as dyes, pigments, plasticizers, or fillers, etc., may be incorporated in a resinous or rubber-like material stabilized by the polymeric trimethyl-tetrahydroquinoline. In many instances, such other addition agents are added concurrently with, and by the same procedure as, the polymeric trimethyl-tetrahydroquinoline. Employment of the latter does not interfere seriously with the action of dyes and pigments in uniformly coloring the products, e.

g. the aforementioned composite polymers stabilized with the polymeric trimethyl-tetrahydroquinoline may be produced in any of a variety of uniform bright colors ranging from red to violet by such incorporation of dyes or pigments therewith. The polymeric trimethyl-tetrahydroquinoline used in stabilizing a composite polymer also has little, if any, effect on the ability of the material to be extruded or molded, or on the dielectric or mechanical properties of the resultant shaped articles.

The following examples describe various ways in which the principle of the invention has been applied and illustrate certain of its advantages, but are not to be construed as limiting the invention:

EXAMPLE 1

A solution of 10 pounds of resinous polymeric 2,2,4-trimethyl-dihydroquinoline and 10 pounds of cyclohexane was treated with 6.4 ounces of activated charcoal having 4.8 per cent by weight of finely divided palladium deposited thereon. The mixture was heated with agitation at a temperature of 170° C. under a hydrogen pressure of from 400 to 450 pounds per square inch, gauge, for a period of 70 hours. From the drop in the pressure of hydrogen which occurred during this period, it was calculated that hydrogen had been consumed in amount slightly exceeding that theoretically required for conversion of the polymeric 2,2,4-trimethyl-dihydroquinoline to a corresponding polymeric trimethyl-tetrahydroquinoline, i. e. the amount of hydrogen consumed was approximately 109 per cent of that theoretically required for such conversion. The pressure was then released, the reaction vessel opened, and the mixture was filtered to remove the catalyst. Cyclohexane was distilled from the filtrate to obtain the polymeric 2,2,4-trimethyltetrahydroquinoline product as a resinous residue. The product was of light-tan color, the color thereof being not nearly as dark, or of as great a depth, as that of the polymeric trimethyl-dihydroquinoline subjected to the hydrogenation.

EXAMPLE 2

In each of a series of experiments, samples of a composite polymer, prepared by consecutively polymerizing 4 parts by weight of styrene and 6 parts of butadiene in the same aqueous emulsion and separating the mixed polymer thereby formed, were subjected to a heat treatment for purpose of determining the time of heating, at a temperature of 150° C. and under a pressure of air, necessary to cause embrittlement of the product. Other samples of the same composite polymer were exposed to ultra-violet light of a standard intensity for a period of 8 hours in order to determine the amount of discoloration which resulted from such exposure. Certain of the samples subjected to these tests consisted of the composite polymer alone, i. e. free of addition agents. Other samples contained the composite polymer in a form having 2 per cent by weight of the respective addition agents named in the following table intimately incorporated together therewith. The mode of incorporating an addition agent together with the polymeric product was by milling, on heated rolls for a period of from 2 to 4 minutes, a mechanical mixture of the polymeric product and the addition agent. After incorporating an addition agent with the polymer, the treated material was compression molded into test pieces at a temperature of 135° C. The test for determining the time of heating of a product in contact with air in order to cause embrittlement was carried out by heating standard-sized strips of the product, $\frac{1}{16}$ inch thick and $\frac{1}{4}$ inch wide, under an air pressure of 80 pounds per square inch, gauge, at a temperature of 150° C., and periodically withdrawing samples and testing them for brittleness by folding a sample sharply upon itself at room temperature. If such folding operation resulted in cracking or breakage of the sample, the material was considered brittle, but if such folding of the product did not result in cracking or breakage, the product was considered non-brittle. Table I names the addition agent employed in each test, gives the hours of heating of test strips at 150° C. under 80 pounds per square inch of air pressure necessary to cause embrittlement of the product, and gives the result of visual inspection of samples after exposure to ultra-violet light of standard intensity for an 8-hour period with regard to the amount of discoloration which resulted from such exposure. Prior to being exposed to ultra-violet light, each of the samples of resinous material was substantially colorless. The effect of the light was to cause darkening of the material.

*Table I*

| Addition Agent | | Embrittled after heatin at 150° C. for— | Discoloration after 8 hours exposure to U. V. light |
| --- | --- | --- | --- |
| Kind | Percent | | |
| None | | 5 hours | Slight. |
| Polymer of 2,2,4-trimethyl-dihydroquinoline. | 2 | 25–30 hrs | Considerable. |
| Polymer of 2,2,4-trimethyl-tetrahydroquinoline. | 2 | 20–25 hrs | Slight. |

EXAMPLE 3

An emulsion of polymeric 2,2,4-trimethyl-tetrahydroquinoline was prepared by dissolving 2 grams of the substance in a solution of 100 grams of styrene, 50 grams of methyl-ethyl ketone, and 11.3 grams of stearic acid, heating the resultant solution to a temperature of from 60° to 70° C. and adding thereto 8 cubic centimeters of a solution of 1.5 parts by volume of methyl-propanol amine and 100 parts of water. The emulsion thus obtained was used in treating an aqueous emulsion of a composite polymer of styrene and butadiene as hereinafter described. Other emulsions comprising polymeric 2,2,4-trimethyl-tetrahydroquinoline, together with other antioxidants as indicated in the following table, were similarly prepared except that the antioxidant was dissolved together with the polymeric 2,2,4-trimethyl-tetrahydroquinoline in the solution of styrene, methyl-ethyl ketone, and stearic acid, prior to addition of the aqueous methyl-propanol amine. In each of a series of experiments, an aqueous emulsion of a composite polymer of 40 per cent by weight styrene and 60 per cent butadiene, prepared by consecutive polymerizations of the styrene and butadiene in an aqueous emulsifying medium, was treated with one of the above-described emulsions of polymeric 2,2,4-trimethyl-tetrahydroquinoline in amount such as to incorporate together with the composite polymer the antioxidizing agents in the proportions indicated in the following table. The resultant emulsified mixture was treated in known manner to coagulate the composite polymer together with the antioxidants. The coagulated material was separated, dried, and molded or extruded into test pieces of standard sizes. In all instances, the extruded pieces were of uniform thickness or diameter throughout their length and possessed a smooth and fairly glossy surface. Certain of the test pieces were used to determine the tensile strength in pounds per square inch, the percent elongation value, the per cent power factor, and the time of heating at 150° C. under 80 pounds per square inch of air pressure necessary to cause embrittlement. Other test pieces were employed to determine the effect of ultra-violet light on the color and transparency of the product. The test for embrittlement of the product by heating in air at 150° C. was carried out as in Example 2. The tests for determining the tensile strength and per cent elongation value were carried out using rods of polymeric material, formed by extrusion through a 3/32 inch die at a die-temperature of 180° C., as the test pieces. Such rod was stretched, on a standard testing device, at a rate of 20 inches per minute and a temperature of approximately 27° C. until breakage occurred. The force, in pounds per square inch of original cross section of the test piece, required to cause breakage and the per cent of its original length by which the test piece was elongated when breakage occurred are the tensile strength and per cent elongation values. The test for determining the per cent power factor at an electric current frequency of $10^6$ cycles per second was carried out in accordance with a procedure described in A. S. T. M. D 150—45 T. In the tests for determination of the effect of ultra-violet light upon the material, samples of the material were tested to determine the amount of white light of standard intensity transmitted therethrough and also to determine the amount of white light of standard intensity reflected therefrom when providing the test pieces with a white background and when providing them with a black background. After determination of these light transmission and light reflection values, the test pieces were exposed to ultra-violet light of standard intensity while at a temperature of 90° F. for a period of 110 hours. The proportion of white light of standard intensity transmitted through the samples and also reflected from the samples, using successively white and black backgrounds, were again determined. From the values thus measured, the light transmission index and also the light reflection index both for a white background and for a black background, were calculated. The light transmission index is obtained by multiplying by 100 the above-mentioned light transmission value after exposure to the ultra-violet light of a sample, and dividing the product by the light transmission value prior to such exposure to the ultra-violet light. Similarly, a light reflection index is obtained by multiplying by 100 the light reflection value after prolonged exposure to the ultra-violet light, and dividing the product by the light reflection value of the sample prior to the exposure to ultra-violet light. The following table names the antioxidants incorporated with the mixed polymer in each test, gives the proportions of the respective antioxidants as per cent by weight, and gives the characteristics of the compositions determined in the ways just described.

Table II

| Run No. | Addition Agents | | Properties of Stabilized Product | | | | | | |
|---|---|---|---|---|---|---|---|---|---|
| | Kind | Per-cent | Tensile Strength, lbs./sq. in. | Percent Elongation | Time of heating to cause embrittlement, Hrs. | Percent Power Factor | Light Trans. Index | Light Reflect. Index | |
| | | | | | | | | With White Background | With Black Background |
| 1 | Polymeric 2,2,4-trimethyl-tetrahydro-quinoline | 2 | 1,220 | 170 | 25–30 | 0.102 | 86 | 75 | 81 |
| 2 | Polymeric 2,2,4-trimethyl-tetrahydro-quinoline / Tertiary-butyl-salol | 2 / 1 | 1,110 | 150 | 25–30 | 0.133 | 103 | 92 | 76 |
| 3 | Polymeric 2,2,4-trimethyl-tetrahydro-quinoline / 2,2-dihydroxy-benzophenone | 2 / 1 | 1,100 | 160 | 25–30 | 0.159 | 101 | 83 | 82 |
| 4 | Polymeric 2,2,4-trimethyl-tetrahydro-quinoline / 2-hydroxy-5-chloro-benzophenone | 2 / 1 | 1,200 | 190 | 25–30 | 0.124 | 82 | 79 | 82 |

The polymeric 2,2,4-trimethyl-tetrahydroquinoline has also been incorporated in minor amount with a copolymer of butadiene, vinylidene chloride and acrylonitrile and with a rubbery copolymer of styrene and butadiene. It has also been incorporated with an aqueous emulsion of a copolymer of styrene and butadiene from which films were cast, without coagulation of the copolymer, and dried to obtain the treated copolymer in film form. In each instance, the polymeric 2,2,4-trimethyl-tetrahydroquinoline was found to be effective in retarding discoloration and other aging effects of heat, light and air on the material treated therewith.

Other modes of applying the principle of the invention may be employed instead of those explained, change being made as regards the method or products herein disclosed, provided the steps or compounds stated by any of the following claims or the equivalent of such stated steps or compounds be employed.

We therefore particularly point out and distinctly claim as our invention:

1. A solid polymer, derived from an aliphatic conjugated diolefine containing from 4 to 6 carbon atoms in the molecule by a polymerization reaction involving the diolefine, which polymer is stabilized against aging by having polymeric 2,2,4-trimethyl-tetrahydroquinoline incorporated therewith.

2. A solid polymer of an aliphatic conjugated diolefine having from 4 to 6 carbon atoms in the molecule, which polymer is stabilized against the effects of aging by having a minor amount, not exceeding 3 per cent by weight, of polymeric 2,2,4-trimethyl-tetrahydroquinoline incorporated together therewith.

3. A polymer derived, by polymerization, from a monovinyl aromatic compound and an aliphatic conjugated diolefine having from 4 to 6 carbon atoms in the molecule, which polymer is stabilized against the effects of aging by having a minor amount, not exceeding 3 per cent by weight, of polymeric 2,2,4-trimethyl-tetrahydroquinoline incorporated together therewith.

4. A rubbery polymer of an aliphatic conjugated diolefine having from 4 to 6 carbon atoms in the molecule, which polymer is stabilized against the effects of aging by having a minor amount, not exceeding 3 per cent by weight, of polymeric 2,2,4-trimethyl-tetrahydroquinoline incorporated together therewith.

5. A rubbery polymer derived, by polymerization, from styrene and an aliphatic conjugated diolefine having from 4 to 6 carbon atoms in the molecule, which polymer is stabilized against the effects of aging by having between 0.5 and 3 per cent by weight polymeric 2,2,4-trimethyl-tetrahydroquinoline incorporated together therewith.

6. A solid, thermoplastic composition comprising a minor amount, not exceeding 3 per cent by weight of polymeric 2,2,4-trimethyl-tetrahydroquinoline intimately admixed with a major amount of a composite polymer of a monovinyl aromatic compound and an aliphatic conjugated diolefine, which composite polymer is prepared by polymerizing a monovinyl aromatic compound while in aqueous emulsion, thereafter adding an aliphatic conjugated diolefine having from 4 to 6 carbon atoms in the molecule and polymerizing the diolefine while in the emulsion.

7. A solid, thermoplastic composition comprising a composite polymer, of styrene and butadiene, stabilized against the effects of aging by having between 0.5 and 3 per cent by weight of polymeric 2,2,4-trimethyl-tetrahydroquinoline incorporated together therewith said composite polymer being one prepared by polymerizing styrene while in aqueous emulsion, thereafter adding butadiene, and polymerizing the butadiene while in the emulsion.

8. In a method of stabilizing a composite polymer of a monovinyl aromatic compound and an aliphatic conjugated diolefine, prepared by polymerizing a monovinyl aromatic compound while in aqueous emulsion, thereafter adding an aliphatic conjugated diolefine having from 4 to 6 carbon atoms in the molecule and polymerizing the latter while in the emulsion, the steps of adding to the aqueous emulsion of the composite polymer an aqueous emulsion of a small amount of polymeric 2,2,4-trimethyl-tetrahydroquinoline, the polymeric 2,2,4-trimethyl-tetrahydroquinoline being added in amount not exceeding 3 per cent of the combined weight of the same and the composite polymer, and thereafter coagulating the mixed polymer and removing it from the liquor.

JAMES B. ARNOLD.
LESTER J. DANKERT.

REFERENCES CITED

The following references are of record in the file of this patent:

UNITED STATES PATENTS

| Number | Name | Date |
|---|---|---|
| Re. 22,808 | Howland | Nov. 5, 1946 |
| 2,064,752 | Ingram | Dec. 15, 1936 |
| 2,302,655 | Rutherford | Nov. 17, 1942 |
| 2,422,932 | Schroeder | June 24, 1947 |